United States Patent [19]
Miura et al.

[11] Patent Number: 6,162,563
[45] Date of Patent: Dec. 19, 2000

[54] POLYMER SOLID ELECTROLYTE

[75] Inventors: Katsuhito Miura; Shigeru Shoji, both of Hyogo; Takahiro Sakashita, Osaka; Yasuo Matoba, Hyogo, all of Japan

[73] Assignee: Daiso Co., LTD, Osaka, Japan

[21] Appl. No.: 09/051,776

[22] PCT Filed: Aug. 19, 1997

[86] PCT No.: PCT/JP97/02854

§ 371 Date: Mar. 11, 1999

§ 102(e) Date: Mar. 11, 1999

[87] PCT Pub. No.: WO98/07772

PCT Pub. Date: Feb. 26, 1998

[30] Foreign Application Priority Data

Aug. 20, 1996 [JP] Japan ................................. 8-218575
Sep. 20, 1996 [JP] Japan ................................. 8-249358

[51] Int. Cl.[7] ............................................. H01M 6/18
[52] U.S. Cl. ...................... 429/309; 429/310; 429/311; 429/312; 429/313
[58] Field of Search .................................. 429/310, 192, 429/304, 308–12, 309

[56] References Cited

U.S. PATENT DOCUMENTS

| | | | |
|---|---|---|---|
| 3,297,783 | 1/1967 | Bailey et al. | 260/836 |
| 4,303,748 | 12/1981 | Armand et al. | 429/192 |
| 4,578,326 | 3/1986 | Armand et al. | 429/192 |
| 4,758,483 | 7/1988 | Armand et al. | 429/192 |
| 4,818,644 | 4/1989 | Armand | 429/192 |
| 4,822,701 | 4/1989 | Ballard et al. | 429/192 |
| 5,162,174 | 11/1992 | Andrei et al. | 429/192 |
| 5,527,639 | 6/1996 | Noda et al. | 429/192 |

FOREIGN PATENT DOCUMENTS

| | | |
|---|---|---|
| 0 174 894 | 3/1986 | European Pat. Off. . |
| 0 222 586 | 5/1987 | European Pat. Off. . |
| 0 392 839 | 10/1990 | European Pat. Off. . |
| 62-169823 | 7/1987 | Japan . |
| 62-249361 | 10/1987 | Japan . |
| 63-154736 | 6/1988 | Japan . |
| 2-235957 | 9/1990 | Japan . |
| 2-295004 | 12/1990 | Japan . |
| 3-47833 | 2/1991 | Japan . |
| 4-68064 | 3/1992 | Japan . |
| 5-304051 | 11/1993 | Japan . |

OTHER PUBLICATIONS

Patent Abstracts of Japan, "Ionically Conductive Polyelectrolyte," Publication No. 04036347, Feb. 6, 1992.
Patent Abstracts of Japan, "Ionically Conductive Polyelectrolyte," Publication No. 03200864, Sep. 2, 1991.
Patent Abstracts of Japan, "Ionically Conductive Polyelectrolyte," Publication No. 03200865, Sep. 2, 1991.
Ballard, D., et al., "Ionic Conductivity in Organic Solids Derived from Amorphous Macromolecules," Macromolecules, vol. 23, pp. 1256–1264 (1990).
Motogami, K., et al., "A New Polymer Electrolyte Based on Polyglycidylether," Electrochima Acta, vol. 37, No. 9, pp. 1725–1727 (1992).
Kono, M., et al., "Synthesis of Polymer Electrolytes Based on Poly[2–(2–methoxyethoxy)ethyl glycidyl ether] and Their High Ionic Conductivity," Polymers for Advanced Technologies, vol. 4, pp. 85–91 (1992).

*Primary Examiner*—Maria Nuzzolillo
*Assistant Examiner*—Mark Ruthkosky
*Attorney, Agent, or Firm*—Foley & Lardner

[57] ABSTRACT

A polymer solid electrolyte obtained by blending (1) a polyether copolymer having a main chain derived form ethylene oxide and an oligooxyethylene side chain, (2) an electrolyte salt compound, and (3) a plasticizer of an aprotic organic solvent or a derivative or metal salt of a polyalkylene glycol having a number-average molecular weight of 200 to 5,000 or a metal salt of the derivative is superior in ionic conductivity and also superior in processability, moldability and mechanical strength to a conventional solid electrolyte. A secondary battery is constructed by using the polymer solid electrolyte in combination with a lithium metal negative electrode and a lithium cobaltate positive electrode.

33 Claims, No Drawings

POLYMER SOLID ELECTROLYTE

FIELD OF THE INVENTION

The present invention relates to a polymer solid electrolyte (solid polyelectrolyte), more particularly to a polymer solid electrolyte which is sensor).

RELATED ART

As an electrolyte constituting an electrochemical device such as battery, capacitor and sensor, those in the form of a solution or a paste have hitherto been used in view of the ionic conductivity. However, the following problems are pointed out. That is, there is a fear of damage of the device arising due to liquid leakage, and subminiaturization and thinning of the device are limited because a separator to be impregnated with an electrolyte liquid is required. To the contrary, a solid electrolyte such as an inorganic crystalline substance, inorganic glass and an organic polymer substance is suggested. The organic polymer substance is generally superior in processability and moldability and the resulting solid electrolyte has good flexibility and bending processability and, furthermore, the design freedom of the device to be applied becomes high and, therefore, the development of the organic polymer substance is expected. However, the organic polymer substance is inferior in ionic conductivity to other materials at present.

For example, a trial of containing a specific alkaline metal salt in a mixture of an epichlorohydrin rubber and a low-molecular weight polyethylene glycol derivative and applying the resultant to a polymer solid electrolyte is suggested in Japanese Patent Kokai Publication No. 235957/1990 filed by the present applicant, but a practically sufficient conductivity value is not still to be obtained.

Furthermore, a polymer solid electrolyte prepared by crosslinking a polymer compound having a number-average molecular weight of 1,000 to 20,000 described in Japanese Patent Kokai Publication Nos. 47833/1991 and 68064/1992 shows a comparatively good ionic conductivity within the practical temperature range, but those having more excellent mechanical characteristics and ionic conductivity are required.

SUMMARY OF THE INVENTION

An object of the present invention provides a solid electrolyte which is superior in mechanical properties and ionic conductivity.

The present invention provides a polymer solid electrolyte (solid polyelectrolyte) comprising:

(1) an optionally crosslinked polyether copolymer having a number-average molecular weight of 10,000 to 2,000,000 and comprising:

(A) 1 to 99% by mol of a repeating unit derived from a monomer represented by the formula (I):

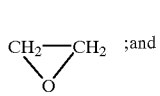

wherein $R^1$ is a group selected from an alkyl group having 1 to 12 carbon atoms, an alkenyl group having 2 to 8 carbon atoms, a cycloalkyl group having 3 to 8 carbon atoms, an aryl group having 6 to 14 carbon atoms, an aralkyl group having 7 to 12 carbon atom and a tetrahydropyranyl group; and n is a numeral of 1 to 12;

(B) 99 to 1% by mol of a repeating unit derived from a monomer represented by the formula (II):

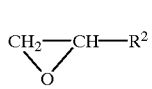

(C) 0 to 15% by mol of a repeating unit derived from a monomer having one epoxy group and at least one reactive functional group;

(2) an electrolyte salt compound; and (3) a plasticizer selected from the group consisting of an aprotic organic solvent, and a derivative or metal salt of a straight-chain or branched polyalkylene glycol having a number-average molecular weight of 200 to 5,000 or a metal salt of the derivative.

The present invention also provides a battery using the above polymer solid electrolyte.

The crosslinked material of the polyether copolymer is used when the dimensional stability at high temperature is required.

When the plasticizer is blended, the crystallization of the polymer is inhibited and the glass transition temperature is lowered and a large amount of an amorphous phase is formed even at low temperature so that the ionic conductivity is improved. It has been found that, when the polymer solid electrolyte of the present invention is used, a high-performance battery having small internal resistance can be obtained. The polymer solid electrolyte of the present invention may be in the gel form. The term "gel" used herein means a polymer swelled with a solvent.

DETAILED DESCRIPTION OF THE INVENTION

The repeating unit (C) may be derived from a monomer of the formula (III-1) or (III-2):

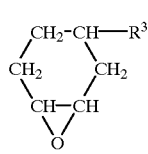

wherein $R^2$ and $R^3$ represent a group having a reactive functional group-containing group.

The copolymer used in the present invention comprises (A) a repeating unit derived from a monomer of the formula (I):

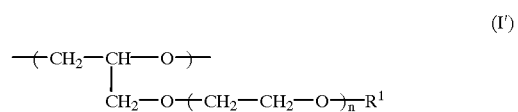

wherein $R^1$ is a group selected from an alkyl group having 1 to 12 carbon atoms, an alkenyl group having 2 to 8 carbon atoms, a cycloalkyl group having 3 to 8 carbon atoms, an aryl group having 6 to 14 carbon atoms, an aralkyl group having 7 to 12 carbon atoms and a tetrahydropyranyl group and (B) a repeating unit derived from a monomer of the formula (II):

 (II')

The copolymer further comprises (C) a repeating unit derived from a monomer having one epoxy group and at least one reactive functional group, if necessary.

The repeating unit (C) derived from the monomer of the formula (III-1) or (III-2) is represented by the formula (III'-1) or (III'-2):

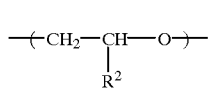 (III'-1)

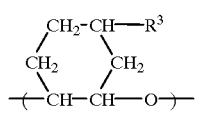 (III'-2)

wherein $R^2$ and $R^3$ represent a reactive functional group-containing group.

The reactive functional group in the repeating unit (C) is preferably (a) a reactive silicon group, (b) an epoxy group, (c) an ethylenically unsaturated group, or (d) a halogen atom.

The polymerization method for the polyether copolymer of the present invention, which may have a crossinkable side chain, is the same as that described in Japanese Patent Kokai Publication Nos. 154736/1988 and 169823/1987.

The polymerization reaction can be conducted as follows. That is, the polyether copolymer can be obtained by reacting the respective monomers at the reaction temperature of 10 to 80° C. under stirring, using a catalyst mainly composed of an organoaluminum, a catalyst mainly composed of an organozinc, an organotin-phosphate ester condensate catalyst, etc. as a ring opening catalyst in the presence or absence of a solvent. The organotin-phosphate ester condensate catalyst is particularly preferable in view of the polymerization degree, or properties of the resulting copolymer. In the polymerization reaction, the reactive functional group does not react so that a copolymer having the reaction functional group is obtained.

In the polyether copolymer of the present invention, the content of the repeating unit (A) is from 1 to 99% by mol, e.g. from 3 to 99% by mol, particularly from 5 to 90% by mol; the content of the repeating unit (B) is from 99 to 1% by mol, e.g. from 95 to 1% by mol, particularly from 90 to 5% by mol; and the content of the repeating unit (C) is from 0 to 15% by mol, e.g. from 0 to 10% by mol, preferably from 0 to 5% by mol, particularly from 0.01 to 5% by mol. When the content of the repeating unit (B) exceeds 99% by mol, an increase in glass transition temperature and crystallization of the oxyethylene chain arise, which results in drastic deterioration of the ionic conductivity of the solid electrolyte. It is generally known that the ionic conductivity is improved by the decrease of crystallizability of polyethylene oxide. It has been found that, in case of the polyether copolymer of the present invention, the effect for improvement of the ionic conductivity is remarkably large.

The glass transition temperature and fusion heat of the polyether copolymer are measured by a differential scanning calorimeter (DSC). In the present invention, the glass transition temperature of the polyether copolymer is preferably not more than −60° C., preferably not more than −63° C.,
e.g. not more than −65° C. The fusion heat of the polyether copolymer is preferably not more than 90 J/g, e.g. not more than 70 J/g, specifically not more than 60 J/g, particularly not more than 50 J/g.

The polyether copolymer may be any copolymer such as a block copolymer and a random copolymer, but the random copolymer is preferable because the effect for reduction of the crystallizability of polyethylene oxide is large. The polyether copolymer of the present invention is a polyether copolymer having an oligooxyethylene side chain and, if necessary, a side chain containing a crosslinkable reactive functional group. The polyether copolymer of the present invention is a copolymer formed from two or more monomers.

The monomer having a reactive silicon group, which constitutes the repeating unit (C), is preferably represented by the formula (III-a-1):

 (III-a-1)

wherein $R^2$ is a reactive silicon-containing group, or the formula (III-a-2):

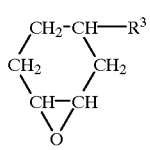 (III-a-2)

wherein $R^3$ is a reactive silicon-containing group.

The reactive silicon group-containing monomer represented by the formula (III-a-1) is preferably a compound represented by the formula (III-a-1-1) or (III-a-1-2).

 (III-a-1-1)

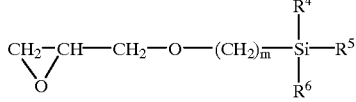 (III-a-1-2)

The reactive silicon group-containing monomer represented by the formula (III-a-2) is preferably a compound represented by the formula (III-a-2-1).

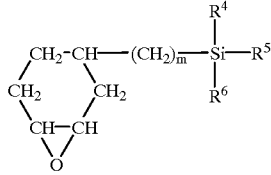 (III-a-2-1)

In the formulas (III-a-1-1), (III-a-1-2) and (III-a-2-1), $R^4$, $R^5$ and $R^6$ may be the same or different, and at least one of them represents an alkoxy group and the remainder represents an alkyl group; and m represents 1 to 6.

Examples of the monomer represented by the formula (III-a-1-1) include 1-glycidoxymethyltrimethoxysilane, 1-glycidoxymethylmethyidimethoxysilane, 2-glycidoxyethyltrimethoxysilane, 2-glycidoxyethylmethyidimethoxysilane, 3-glycidoxypropylmethyldimethoxysilane, 3-glycidoxypropyltrimethoxysilane, 4-glycidoxybutylmethyidimethoxysilane, 4-glycidoxybutylmethyltrimethoxysilane, 6-glycidoxyhexylmethyidimethoxysilane and 6-glycidoxyhexylmethyltrimethoxysilane.

Examples of the monomer represented by the formula (III-a-1-2) include 3-(1,2-epoxy)propyltrimethoxysilane, 3-(1,2-epoxy)propylmethyidimethoxysilane, 3-(1,2-epoxy)propyldimethylmethoxysilane, 4-(1,2-epoxy) butyltrimethoxysilane, 4-(1,2-epoxy) butylmethylditrimethoxysilane, 5-(1,2-epoxy) pentyltrimethoxysilane, 5-(1,2-epoxy) pentylmethyldimethoxysilane, 6-(1,2-epoxy) hexyltrimethoxysilane and 6-(1,2-epoxy) hexylmethyldimethoxysilane.

Examples of the monomer represented by the formula (III-a-2-1) include 1-(3,4-epoxycyclohexyl) methyltrimethoxysilane, 1-(3,4-epoxycyclohexyl) methylmethyldimethoxysilane, 2-(3,4-epoxycyclohexyl) ethyltrimethoxysilane, 2-(3,4-epoxycyclohexyl) ethylmethyldimethoxysilane, 3-(3,4-epoxycyclohexyl) propyltrimethoxysilane, 3-(3,4-epoxycyclohexyl) propylmethyidimethoxysilane, 4-(3,4-epoxycyclohexyl) butyltrimethoxysilane and 4-(3,4-epoxycyclohexyl) butylmethyldimethoxysilane.

Among them, 3-glycidoxypropyltrimethoxysilane, 3-glycidoxypropylmethyidimethoxysilane, 4-(1,2-epoxy) butyltrimethoxysilane, 5-(1,2-epoxy)pentyltrimethoxysilane and 2-(3,4-epoxycyclohexyl) ethyltrimethoxysilane are particularly preferable.

The monomer having two epoxy groups, which constitutes the repeating unit (C), is preferably represented by the formula (III-b):

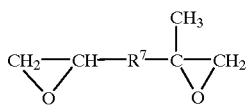

(III-b)

wherein $R^7$ is a divalent organic group. $R^7$ is preferably an organic group consisting of elements selected from hydrogen, carbon and oxygen.

It is preferable that the group $R^7$ in the formula (III-b) is

—CH$_2$—O—(CHA$^1$—CHA$^2$—O)$_m$—CH$_2$—, or

—(CH$_2$)$_m$—, or

—CH$_2$O—Ph—OCH$_2$— wherein $A^1$ and $A^2$ represent hydrogen or a methyl group; Ph represents a phenylene group; and m represents a numeral of 0 to 12.

The monomer having two epoxy groups is preferably a compound represented by the formula (III-b-1), (III-b-2) or (III-b-3):

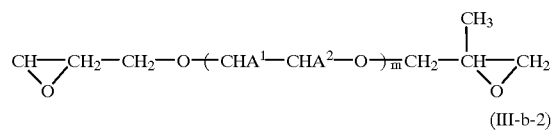

(III-b-1)

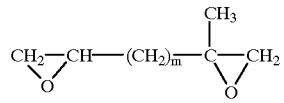

(III-b-2)

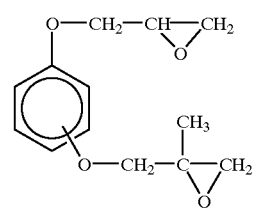

(III-b-3)

In the formulas (III-b-1), (III-b-2) and (III-b-3), $A^1$ and $A^2$ represent hydrogen or a methyl group; and m represents a numeral of 0 to 12.

Examples of the monomer represented by the formula (III-b-1) include 2,3-epoxypropyl-2',3'-epoxy-2'-methylpropyl ether, ethyleneglycol-2,3-epoxypropyl-2',3'-epoxy-2'-methylpropyl ether and diethyleneglycol-2,3-epoxypropyl-2',3'-epoxy-2'-methylpropyl ether. Examples of the monomer represented by the formula (III-b-2) include 2-methyl-1,2,3,4-diepoxybutane, 2-methyl-1,2,4,5-diepoxypentane and 2-methyl-1,2,5,6-diepoxyhexane. Examples of the monomer represented by the formula (III-b-3) include hydroquinone-2,3-epoxypropyl-2',3'-epoxy-2'-methylpropyl ether and catechol-2,3-epoxypropyl-2',3'-epoxy-2'-methylpropyl ether.

Among them, 2,3-epoxypropyl-2',3'-epoxy-2'-methylpropyl ether and ethyleneglycol-2,3-epoxypropyl-2',3'-epoxy-2'-methylpropyl ether are particularly preferable.

The monomer having an ethylenically unsaturated group, which constitutes the repeating unit (C), is represented by the formula (III-c):

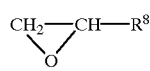

(III-c)

wherein $R^8$ is a group having an ethylenically unsaturated group.

As the ethylenically unsaturated group-containing monomer, there can be used allyl glycidyl ether, 4-vinylcyclohexyl glycidyl ether, α-terpinyl glycidyl ether, cyclohexenylmethyl glycidyl ether, p-vinylbenzyl glycidyl ether, allylphenyl glycidyl ether, vinyl glycidyl ether, 3,4-epoxy-1-butene, 3,4-epoxy-1-pentene, 4,5-epoxy-2-pentene, 1,2-epoxy-5,9-cyclododecadiene, 3,4-epoxy-1-vinylcyclohexene, 1,2-epoxy-5-cyclooctene, glycidyl acrylate, glycidyl methacrylate, glycidyl sorbate, glycidyl cinnamate, glycidyl crotonate, glycidyl-4-hexenoate, oligoethylene glycol glycidyl ether acrylate having 1 to 12 oxyethylene chains, oligoethylene glycol glycidyl ether methacrylate having 1 to 12 oxyethylene chains, oligoethylene glycol allyl glycidyl ether having 1 to 12 oxyethylene chains or

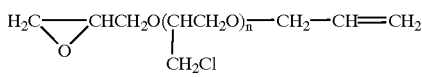

(n=1–12). Preferable examples thereof include allyl glycidyl ether, glycidyl acrylate and glycidyl methacrylate.

The monomer (C) having a halogen atom is preferably represented by the formula (III-d):

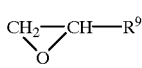 (III-d)

wherein $R^9$ is a group having at least one halogen atom.

Examples of the monomer having a halogen atom include:

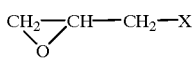

wherein X is a halogen atom, particularly a bromine atom (Br) or an iodine atom (I).

The polymerization degree n of the oxyethylene unit of the side chain portion in the monomer (I) constituting the repeating unit (A), is preferably from 1 to 12, e.g. from 1 to 6. When the polymerization degree n exceeds 12, the ionic conductivity of the resulting polymer solid electrolyte is deteriorated unfavorably. In the monomer (I), $R^1$ may be a methyl group, an ethyl group, a propyl group, a butyl group, a pentyl group, a hexyl group, an allyl group or a cyclohexyl group.

The number-average molecular weight of the polyether copolymer is within the range from 10,000 to 2,000,000, e.g. from 50,000 to 2,000,000, preferably from 100,000 to 2,000,000, so as to obtain excellent processability, moldability, mechanical strength and flexibility. When the number-average molecular weight is smaller than 10,000, it is necessary to increase the crosslink density so as to maintain the mechanical strength or to prevent from flowing at high temperature, which results in deterioration of ionic conductivity of the resulting polymer solid electrolyte. On the other hand, when it exceeds 2,000,000, the processability and moldability become insufficient.

In the crosslinking of the copolymer wherein the reactive functional group is a reactive silicon group, the crosslinking can be conducted by the reaction between the reactive silicon group and water. In order to increase the reactivity, there may be used, as a catalyst, organometal compounds, for example, tin compounds such as dibutyltin dilaurate, dibutyltin maleate, dibutyltin diacetate, tin octylate and dibutyltin acetylacetonate; titanium compounds such as tetrabutyl titanate and tetrapropyl titanate; aluminum compounds such as aluminum trisacetyl acetonate, aluminum trisethyl acetoacetate and diisopropoxyaluminum ethylacetoacetate; or amine compounds such as butylamine, octylamine, laurylamine, dibutylamine, monoethanolamine, diethanolamine, triethanolamine, diethylenetriamine, trietylenetetraamine, cyclohexylamine, benzylamine, diethylaminopropylamine, guanine and diphenylguanine.

As the crosslinking method of the copolymer wherein the reactive functional group is an epoxy group, polyamines, acid anhydrides and the like are used.

Examples of the polyamines include aliphatic polyamines such as diethylenetriamine, dipropylenetriamine, triethylenetramine, tetraethylenepentamine, dimethylaminopropylamine, diethylaminopropylamine, dibutylaminopropylamine, hexamethylenediamine, N-aminoethylpiperazine, bis-aminopropylpiperazine, trimethylhexamethylenediamine and dihydrazide isophthalate; and aromatic polyamines such as 4,4'-diaminodiphenyl ether, diaminodiphenyl sulfone, m-phenylenediamine, 2,4-toluylenediamine, m-toluylenediamine, o-toluylenediamine and xylylenediamine. The amount of the polyamine varies depending on the type of the polyamine, but is normally within the range from 0.1 to 10% by weight based on the whole composition excluding a plasticizer.

Examples of the acid anhydrides includes maleic anhydride, dodecenylsuccinic anhydride, chlorendic anhydride, phthalic anhydride, pyromellitic anhydride, hexahydrophthalic anhydride, methylhexahydrophthalic anhydride, tetramethylenemaleic anhydride, tetrahydrophthalic anhydride, methyltetrahydrophthalic anhydride and trimellitic anhydride. The amount of the acid anhydrides varies depending on the type of the acid anhydride, but is normally within the range from 0.1 to 10% by weight based on the whole composition excluding a plasticizer. In the crosslinking, an accelerator can be used. In the crosslinking reaction of polyamines, the accelerator includes phenol, cresol, resorcin, pyrogallol, nonyl phenol, 2,4,6-tris (dimethylaminomethyl)phenol. In the crosslinking reaction of the acid anhydride, the accelerator includes benzyldimethylamine, 2,4,6-tris(dimethylaminomethyl) phenol, 2-(dimethylaminoethyl)phenol, dimethylaniline and 2-ethyl-4-methylimidazol. The amount of the accelerator varies depending on the type of the accelerator, but is normally within the range from 0.1 to 10% by weight based on the crosslinking agent.

In the crosslinking method used in the copolymer, when a reactive functional group is the ethylenically unsaturated group, a radical initiator such as an organic peroxide and an azo compound, or active energy ray such as ultraviolet ray and electron ray can be used. It is also possible to use a crosslinking agent having silicon hydride.

As the organic peroxide, there can be used those which are normally used for the crosslinking, such as ketone peroxide, peroxy ketal, hydroperoxide, dialkyl peroxide, diacyl peroxide, peroxy ester and the like. Specific examples thereof include methyl ethyl ketone peroxide, cyclohexanone peroxide, 1,1-bis(t-butylperoxy)-3,3,5-trimethylcyclohexane, 2,2-bis(t-butylperoxy)octane, n-butyl-4,4-bis(t-butylperoxy)valerate, t-butylhydroperoxide, cumene hydroperoxide, 2,5-dimethylhexane-2,5-dihydroperoxide, di-t-butyl peroxide, t-butylcumyl peroxide, dicumyl peroxide, α,α'-bis(t-butylperoxy-m-isopropyl) benzene, 2,5-dimethyl-2,5-di(t-butylperoxy)hexane, 2,5-dimethyl-2,5-di(t-butylperoxy) hexane, benzoylperoxide and t-butylperoxyisopropylcarbonate. The amount of the organic peroxide varies depending on the type of the organic peroxide, but is normally within the range from 0.1 to 10% by weight based on the whole composition excluding a plasticizer.

As the azo compound, there can be used those which are normally used in the crosslinking, such as azonitrile compound, azoamide compound, azoamidine compound and the like. Specific examples thereof include 2,2'-azobisisobutyronitrile, 2,2'-azobis(2-methylbutyronitrile), 2,2'-azobis(4-methoxy-2,4-dimethylvaleronitrile), 2,2'-azobis(2,4-dimethylvaleronitrile), 1,1'-azobis(cyclohexane-1-carbonitrile), 2-(carbamoylazo)isobutyronitrile, 2-phenylazo-4-methoxy-2,4-dimethyl-valeronitrile, 2,2'-azobis(2-methyl-N-phenylpropionamidine)dihydrochloride, 2,2'-azobis[N-(4-chlorophenyl)-2-methylpropionamidine] dihydrochloride, 2,2'-azobis[N-hydroxyphenyl-2-methylpropionamidine]dihydrochloride, 2,2'-azobis[2-methyl-N-(phenylmethl) propionamidine]dihydrochloride, 2,2'-azobis[2-methyl-N-(2-propenyl) propionamidine] dihydrochloride, 2,2'-azobis(2-methyl-propionamidine) dihydrochloride, 2,2'-azobis[N-(2-hydroxyethyl)-2-methyl-propionamidine] dihydrochloride, 2,2'-azobis[2-(5-methyl-2-imidazolin-2-yl)propane]-dihydrochloride, 2,2'-azobis[2-(2-imidazolin-2-yl)propane]dihyrochloride, 2,2'-azobis[2-(4,5,6,7-tetrahydro-1H- 1,3-diazepin-2-yl)propane] dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl)propane]dihydrochloride, 2,2'-azobis{2-[1-(2-hydroxyethyl)-2-imidazolin-2-yl]propane}dihydrochloride, 2,2'-azobis[2-(2-imidazolin-2-yl)propane], 2,2'-azobis{2-methyl-N-[1,1-bis(hydroxymethyl)-2-hydroxyethyl] propionamide}, 2,2'-azobis{2-methyl-N-[1,1-bis(hydroxymethyl)ethyl]propionamide}, 2,2'-azobis[2-methyl-N-(2-hydroxyethyl)propionamide], 2,2'-azobis(2-methylpropionamide)dihydrate, 2,2'-azobis(2,4,4-trimethylpentane), 2,2'-azobis(2-methylpropane), 2,2'-azobisisobutyrate, 4,4'-azobis(4-cyanovalerate) and 2,2'-azobis[2-(hydroxy-methyl)propionitrile]. The amount of the azo compound varies depending on the type of the azo compound, but is normally within the range from 0.1 to 10% by weight based on the whole composition excluding a plasticizer.

In the crosslinking due to radiation of activated energy ray such as ultraviolet ray, glycidyl acrylate ether, glycidyl methacrylate ether and glycidyl cinnamate ether are particularly preferable among the monomer component represented by the formula (III-c). Furthermore, as an auxiliary sensitizer, there can be optionally used acetophenones such as diethoxyacetophenone, 2-hydroxy-2-methyl-1-phenylpropan-1-one, benzyldimethylketal, 1-(4-isopropylphenyl)-2-hydroxy-2-methylpropan-1-one, 4-(2-hydroxyethoxy)phenyl-(2-hydroxy-2-propyl)ketone, 2,2-dimethoxy-1,2-diphenylethan-1-one, 1-hydroxy-cyclohexyl-phenylketone and 2-methyl-2-morpholino(4-thiomethylphenyl)-propan-1-one; benzoin ethers such as benzoin, benzoin methyl ether, benzoin ethyl ether, benzoin isopropyl ether and benzoin isobutyl ether; benzophenones such as benzophenone, methyl o-benzoylbenzoate, 4-phenylbenzophenone, hydroxybenzophenone, 4-benzoyl-4'-methyl-diphenyl sulfide, alkylated benzophenone, 3,3',4,4'-tetra(t-butylperoxycarbonyl)benzophenone, 4-benzoyl-N,N-dimethyl-N-[2-(1-oxo-2-propenyloxy)ethyl] benzenemethanaminium bromide and (4-benzoylbenzyl) trimethylammonium chloride; thioxanthones such as 2-isopropyl-thioxanthone, 2,4-dimethylthioxanthone, 2,4-diethylthioxanthone, 2,4-dichloro-thioxanthone; azides such as azidopyrene, 3-sulfonylazido-benzoic acid, 4-sulfonylazidobenzoic acid, 2,6-bis(4'-azidobenzal) cyclohexanone-2,2'-disulfonic acid (sodium salt), p-azidobenzaldehyde, p-azidoacetophenone, p-azidobenzoinic acid, p-azidobenzalacetophenone, p-azidobenzalacetone, 4,4'-diazidochalcone, 1,3-bis(4'-azidobenzal)acetone, 2,6-bis(4'-azidobenzal) cyclohexanone, 2,6-bis(4-azidobenzal)4-methylcyclohexanone, 4,4'-diazidostilbene-2,2'-disulfonic acid, 1,3-bis(4'-azidobenzal)-2-propanone-2'-sulfonic acid and 1,3-bis(4'-azidocinnacylidene)-2-propanone.

As an auxiliary crosslinking agent, there can be optionally used ethylene glycol diacrylate, ethylene glycol dimethacrylate, oligoethylene glycol diacrylate, oligoethylene glycol dimethacrylate, propylene glycol diacrylate, propylene glycol dimethacrylate, oligopropylene glycol diacrylate, oligopropylene glycol dimethacrylate, 1,3-butylene glycol diacrylate, 1,4-butylene glycol diacrylate, 1,3-glycerol dimethacrylate, 1,1,1-trimethylolpropane dimethacrylate, 1,1,1-trimethylolethane diacrylate, pentaerythritoltrimethacrylate, 1,2,6-hexanetriacrylate, sorbitol pentamethacrylate, methylenebisacrylamide, methylenebismethacrylamide divinyl benzene, vinyl methacrylate, vinyl crotonate, vinyl acrylate, vinyl acetylene, trivinyl benzene, triallyl cyanyl sulfide, divinyl ether, divinyl sulfo ether, diallyl phthalate, glycerol trivinyl ether, allyl methacrylate, allyl acrylate, diallyl maleate, diallyl fumarate, diallyl itaconate, methyl methacrylate, butyl acrylate, ethyl acrylate, 2-ethylhexyl acrylate, lauryl methacrylate, ethylene glycol acrylate, triallyl isocyanurate, maleimide, phenylmaleimide, p-quinonedioxime, maleic anhydride and itaconic acid.

As the compound having silicon hydride, which is used for crosslinking the ethylenically unsaturated group, a compound having at least two silicon hydrides can be used. Particularly, a polysiloxane compound and a polysilane compound are preferable.

Examples of the polysiloxane compound include a linear polysiloxane compound represented by the formula (a-1) or (a-2), or a cyclic polysiloxane compound represented by the formula (a-3).

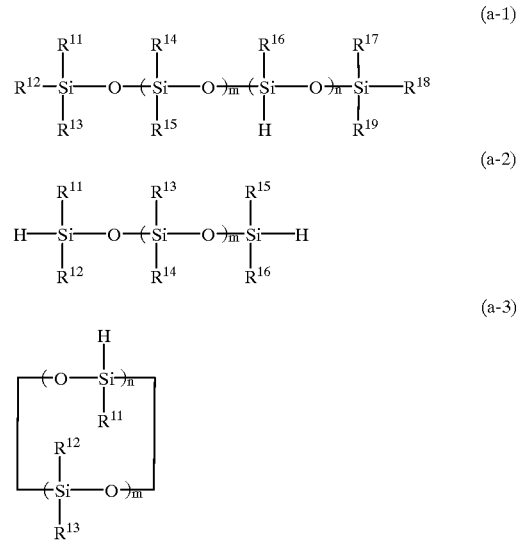

In the formulas (a-1) to (a-3), $R^{11}$, $R^{12}$, $R^{13}$, $R^{14}$, $R^{15}$, $R^{16}$, $R^{17}$, $R^{18}$ and $R^{19}$ respectively represent a hydrogen atom or an alkyl or alkoxy group having 1 to 12 carbon atoms; and $n \geq 2$, $m \geq 0$, $2 \leq m+n \leq 300$. As the alkyl group, a lower alkyl group such as methyl group and ethyl group is preferable. As the alkoxy group, a lower alkoxy group such as methoxy group and ethoxy group is preferable.

As the polysilane compound, a linear silane compound represented by the formula (b-1) is used.

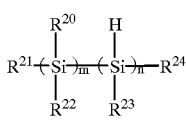

(b-1)

In the formula (b-1), $R^{20}$, $R^{21}$, $R^{22}$, $R^{23}$ and $R^{24}$ respectively represent a hydrogen atom or an alkyl or alkoxy group having 1 to 12 carbon atoms; and $n \geq 2$, $m \geq 0$, $2 \leq m+n \leq 100$.

Examples of the catalyst for the hydrosilylation reaction include transition metals such as palladium and platinum, or a compound or complex thereof. Furthermore, a peroxide, an amine and a phosphine can also be used. The most popular catalyst includes dichlorobis(acetonitrile)palladium (II), chlorotris(triphenylphosphine)rhodium(I) and chloroplatinic acid.

In the crosslinking method of the copolymer containing a halogen atom (e.g. bromine atom or iodine atom), for example, a crosslinking agent such as polyamines, mercaptoimidazolines, mercaptopyrimidines, thioureas and polymercaptanes can be used. Examples of the polyamines include hexamethylenediamine carbamate, triethylenetetramine, tetraethylenepentamine, ethylenediamine carbamate, diethylenetriamine, dipropylenetriamine, dimethylaminopropylamine, diethylaminopropylamine, dibutylaminopropylamine, hexamethylenediamine, trimethylhexamethylenediamine, diaminophenyl sulfone, m-phenylenediamine, 2,4-toluylenediamine, m-toluylenediamine, o-toluylenediamine and xylylenediamine. Examples of the mercaptoimidazolines include 2-mercaptoimidazoline, 4-methyl-2-mercaptoimidazoline and 5-ethyl-4-butyl-2-mercaptoimidazoline. Examples of the mercaptopyrimidines include 2-mercaptopyrimidine, 4,6-dimethyl-2-mercaptopyrimidine and 5-butyl-2-mercaptopyrimidine. Examples of the thioureas include thiourea, ethylene thiourea, dibutyl thiourea, trimethyl thiourea, triethyl thiourea and tributyl thiourea. Examples of the polymercaptanes include 2-dibutylamino-4,6-dimethylcapto-s-triazine, 2-phenylamino-4,6-dimercaptotriazine, 2,5-dimercapto-1,3,4-thiazole, 1,10-decanedithiol, 2,3-dimercaptopyrazine, 2,3-dimercaptoquinoxaline and 6-methylquinoxaline-2,3-dithiocarbonate. The amount of the crosslinking agent varies depending on the type of the crosslinking agent, but is normally from 0.1 to 30% by weight based on the whole composition excluding a plasticizer.

It is effective to add a metal compound as an acid acceptor to the polymer solid electrolyte in view of the thermal stability of the halogen-containing polymer. Examples of the metal oxide as the acid acceptor include oxide, hydroxide, carbonate salt, carboxylate salt, silicate, borate salt and phosphite salt of Group II metal of the periodic table; and oxide, basic carbonate salt, basic carboxylate salt, basic phosphite salt, basic sulfite salt and tribasic sulfate salt of Group VIa metal of the periodic table. Specific examples thereof include magnesia, magnesium hydroxide, barium hydroxide, magnesium carbonate, barium carbonate, quick lime, slaked lime, calcium carbonate, calcium silicate, calcium stearate, zinc stearate, calcium phthalate, magnesium phosphite, calcium phosphite, zinc white, tin oxide, litharge, red lead, white lead, dibasic lead phthalate, dibasic lead carbonate, tin stearate, basic lead phosphite, basic tin phosphite, basic lead sulfite and tribasic lead sulfate. The amount of the metal compound as the acid acceptor varies depending on the type thereof, but is normally from 0.1 to 30% by weight based on the whole composition excluding a plasticizer.

The electrolyte salt compound used in the present invention is preferably soluble in a mixture comprising a polyether copolymer or a crosslinked material of the copolymer, and a plasticizer. In the present invention, the following salt compounds are preferably used.

That is, examples thereof include a compound comprising a cation selected from a metal cation, ammonium ion, amidinium ion and guanidium ion, and an anion selected from chlorine ion, bromine ion, iodine ion, perchlorate ion, thiocyanate ion, tetrafluoroborate ion, nitrate ion, $AsF_6^-$; $PF_6^-$; stearylsulfonate ion, octylsulfonate ion, dodecylbenzenesulfonate ion, naphthalenesufonate ion, dodecylnaphthalenesulfonate ion, 7,7,8,8-tetracyano-p-quinodimethane ion, $X^1SO_3^-$—, $(X^1SO_2)(X^2SO_2)N$—, $(X^1SO_2)(X^2SO_2)(X^3SO_2)C$— and $(X^1SO_2)(X^2SO_2)YC^-$, wherein $X^1$, $X^2$, $X^3$ and Y respectively represent an electron attractive group. Preferably, $X^1$, $X^2$ and $X^3$ independently represent a perfluoroaryl group or a perfluoroalkyl group having 1 to 6 carbon atoms and Y represents a nitro group, a nitroso group, a carbonyl group, a carboxyl group or a cyano group. $X^1$, $X^2$ and $X^3$ may be the same or different. As the metal cation, a cation of a transition metal can be used. Preferably, a cation of a metal selected from Mn, Fe, Co, Ni, Cu, Zn and Ag metals is used. When using a cation of a metal selected from Li, Na, K, Rb, Cs, Mg, Ca and Ba metals, good results are obtained. Two or more compounds described above may be used as the electrolyte salt compound.

The plasticizer is an aprotic organic solvent, or a derivative or metal salt of a straight-chain or branched polyalkylene glycol having a number-average molecular weight of 200 to 5,000, or a metal salt of the derivative.

As the aprotic organic solvent, aprotic ethers and esters are preferable. Specific examples include propylene carbonate, γ-butyrolactone, butylene carbonate, ethylene carbonate, dimethyl carbonate, ethylmethyl carbonate, diethyl carbonate, 1,2-dimethoxyethane, 1,2-dimethoxypropane, 3-methyl-2-oxazolidone, tetrahydrofuran, 2-methyltetrahydrofuran, 1,3-dioxolane, 4,4-methyl-1,3-dioxolane, tert-butyl ether, iso-butylether, 1,2-ethoxymethoxyethane, ethylene glycol dimethyl ether, ethylene glycol diethyl ether, triethylene glycol dimethyl ether, triethylene glycol diethyl ether, tetraethylene glycol dimethyl ether, tetraethylene glycol diethyl ether, ethylene glyme, ethylene diglyme, methyl tetraglyme, methyl triglyme, methyl diglyme, methyl formate, methyl acetate and methyl propionate. A mixture of two or more of them may be used. Particularly, propylene carbonate, γ-butyrolactone, butylene carbonate and 3-methyl-2-oxazolidone are preferable. Triethylene glycol dimethyl ether, triethylene glycol diethyl ether, tetraethylene glycol dimethyl ether and tetraethylene glycol diethyl ether are also particularly preferable organic solvents.

The derivative or metal salt of the straight-chain or branched polyalkylene glycol or the metal salt of the derivative can be obtained from a polyalkylene glycol having a number-average molecular weight of 200 to 5,000. Examples of the polyalkylene glycol include polyethylene glycol or polypropylene glycol. Examples of the derivative thereof include an ester derivative or ether derivative containing an alkyl group having 1 to 8 carbon atoms or an alkenyl group having 3 to 8 carbon atoms.

Among the derivatives, examples of the ether derivative include diethers such as dimethyl ether, diethyl ether, dipropyl ether and diallyl ether of polyalkylene glycol, and examples of the ester derivatives include diesters such as dimethacrylate ester, diacetate ester and diacrylate ester of polyalkylene glycol.

Examples of the metal salt of the derivative include sodium, lithium and dialkylaluminum salts of monoethers of polyalkylene glycol, such as monomethyl ether, monoethyl ether and monopropyl ether, monobutyl ether, monohexyl ether, mono-2-ethyl-hexyl ether and monoallyl ether; and monoesters of polyalkylene glycol such as monoacetate ester, monoacrylate ester and monomethacrylate ester.

Examples of the metal salt include sodium, lithium and dialkyl aluminum salt of polyalkylene glycol.

The number-average molecular weight of the polyalkylene glycol used is more preferably within the range from 200 to 2,000.

In the present invention, the amount of the electrolyte salt compound is so that a value of a molar ratio of the number of moles of the electrolyte salt compound to the total number of moles of oxyethylene units (the total number of moles of oxyethylene units including the main chain and side chain of the polyether copolymer) is preferably within the range from 0.0001 to 5, more preferably from 0.001 to 0.5. When this value exceeds 5, the processability and moldability, and the mechanical strength and flexibility of the resulting solid electrolyte are deteriorated. Furthermore, the ionic conductivity is also deteriorated.

The amount of the plasticizer is optionally selected, but is preferably from 1 to 2,000 parts by weight, e.g. 10 to 1,000 parts by weight, particularly from 10 to 500 parts by weight, based on 100 parts by weight of the polyether copolymer.

The flame retardance is required when using the polymer solid electrolyte, a flame retardant can be used. An effective amount of those selected from halide (e.g. brominated epoxy compound, tetrabromobisphenol A and chlorinated paraffin), antimony trioxide, antimony pentaoxide, aluminum hydroxide, magnesium hydroxide, phosphate ester, polyphosphate salt and zinc borate are added.

The method for production of the polymer solid electrolyte of the present invention is not specifically limited, and, usually, the respective components may be mechanically mixed. In case of the multicomponent-copolymer requiring crosslinking, it is produced by a method of mechanically mixing the respective components, followed by crosslinking. Alternatively, after crosslinking, the crosslinked copolymer may be impregnated by immersing in a plasticizer for a long time. As means for mechanically mixing, various kneaders, open roll, extruder and the like can be optionally used.

In case that the reactive functional group is a reactive silicon group, the amount of water used in the crosslinking reaction is not specifically limited because the crosslinking reaction occurs even in the presence of moisture in the atmosphere. The crosslinking can also be conducted by passing through a cold water or hot water bath for a short time, or exposing to a steam atmosphere.

In case of the copolymer wherein the reactive functional group is an epoxy group-containing group, the crosslinking reaction is completed at the temperature of 10 to 200° C. within 10 minutes to 20 hours when the polyamine or acid anhydride is used. In case that the reactive functional group is an ethylenically unsaturated group, the crosslinking reaction is completed at the temperature of 10 to 200° C. within 1 minute to 20 hours when radical initiator is used. When using energy ray such as ultraviolet ray, a sensitizer is normally used. The crosslinking reaction is normally completed at the temperature of 10 to 150° C. within 0.1 seconds to 1 hour. In case of the crosslinking agent having silicon hydride, the crosslinking reaction is completed at the temperature of 10 to 180° C. within 10 minutes to 10 hours.

The method of mixing the electrolyte salt compound and plasticizer with the polyether copolymer is not specifically limited, but examples thereof include a method of immersing the polyether copolymer in an organic solvent containing the electrolyte salt compound and plasticizer for a long time, a method of mechanically mixing the electrolyte salt compound and plasticizer with the polyether copolymer, a method of dissolving and mixing the polyether copolymer and electrolyte salt compound in the plasticizer, and a method of dissolving the polyether copolymer once in the other organic solvent and mixing the resulting solution with the plasticizer. When using the organic solvent, various polar solvents such as tetrahydrofuran, acetone, acetonitrile, dimethylformamide, dimethyl sulfoxide, dioxane, methyl ethyl ketone and methyl isobutyl ketone may be used alone or in combination thereof.

The polymer solid electrolyte according to the present invention is superior in mechanical strength and flexibility so that a large area thin-film solid electrolyte can be easily obtained by utilizing the properties. For example, it is possible to make a battery using the polymer electrolyte of the present invention. In this case, examples of the positive electrode material include lithium-manganese double oxide, lithium cobaltate, vanadium pentaoxide, polyacene, polypyrene, polyaniline, polyphenylene, polyphenylene sulfide, polyphenylene oxide, polypyrrole, polyfuran and polyazulene. Examples of the negative electrode material include an interlaminar compound prepared by occlusion of lithium between graphite or carbon layers, a lithium metal and a lithium-lead alloy. The crosslinked polymer solid electrolyte can also be used as a diaphragm of an ion electrode of cation such as alkaline metal ion, Cu ion, Ca ion and Mg ion with taking advantage of high electrical conductivity . The polymer solid electrolyte of the present invention is suitable as a material for electrochemical device (e.g. battery, capacitor and sensor).

PREFERRED EMBODIMENTS OF THE INVENTION

The present invention will be illustrated by the following Examples.

The results of Examples and Comparative Examples are shown in Table 1 to Table 5. The glass transition temperature and fusion heat were measured in a nitrogen atmosphere within the temperature range from −100° C. to 80° C. at a heating rate of 10° C./min., using a differential scanning calorimeter DSC 8230B manufactured by Rigaku Denki Co., Ltd. The measurement of the conductivity σ was conducted as follows. That is, a gel-like film at 20° C. was sandwiched between platinum electrodes and the conductivity was calculated according to the complex impedance method, using an A.C. method (voltage: 0.5 V, frequency: 5 Hz to 1 MHz).

The composition (in terms of monomer) of the copolymer was determined by $^1$H NMR spectrum. In case of the measurement of the molecular weight of the copolymer, the gel permeation chromatography measurement was conducted and the molecular weight was calculated in terms of standard polystyrene. The gel permeation chromatography measurement was conducted at 60° C. by a measuring device RID-6A manufactured by Shimadzu Corp., using a column (manufactured by Showa Denko Co., Ltd.) such as Showdex KD-807, KD-806, KD-806M and KD-803, and a solvent DMF.

PREPARATION EXAMPLE (production of catalyst)

Tributyltin chloride (10 g) and tributyl phosphate (35 g) were charged in a three-necked flask equipped with a stirrer, a thermometer and a distillation device, and the mixture was heated at 250° C. for 20 minutes while stirring under a current of nitrogen and the distillate was distilled off to obtain a solid condensate. This organotin-phosphate ester condensate was used as a polymerization catalyst.

Example 1

After the atmosphere in a four-necked glass flask (internal volume: 3 L) was replaced by nitrogen, an organotin-phosphate ester condensate (1 g) as the catalyst, diethylene glycol glycidyl methyl ether (42 g) having water content adjusted to not more than 10 ppm and n-hexane (1,000 g) as the solvent were charged in the flask, and ethylene oxide (200 g) was gradually added with monitoring the polymerization degree of diethylene glycol glycidyl methyl ether by gas chromatography. The polymerization reaction was terminated by using methanol. The polymer was isolated by decantation, dried at 40° C. under a normal pressure for 24 hours, and then dried at 45° C. under reduced pressure for 10 hours to obtain 200 g of a polymer. The glass transition temperature of this copolymer was −61° C., the number-average molecular weight measured by the gel permeation chromatography was 1,100,000 and the fusion heat was 0 J/g. The results of the composition analysis (in terms of monomer) of this polymer by $^1$H NMR spectrum are as shown in Example 1 of Table 1. The resulting polyether copolymer (1 g) was mixed with a propylene carbonate solution (1.5 ml) of lithium perchlorate so that a molar ratio of the number of moles of the soluble electrolyte salt compound to the total number of moles of ethylene oxide units in the copolymer was 0.05. This mixture liquid was casted on a mold made of polytetrafluoroethylene, heated and pressurized at 100° C. and 20 KgW/cm$^2$ for 10 minutes to obtain a film.

Example 2

The polyether copolymer (1 g) shown in Table 1 polymerized by using the organotin-phosphate ester condensate catalyst and dicumyl peroxide (a crosslinking agent) (0.015 g) were dissolved in tetrahydrofuran (20 ml), and the resulting solution was mixed with a tetrahydrofuran solution of lithium perchlorate (5 ml) so that a molar ratio of the number of moles of the soluble electrolyte salt compound to the total number of ethylene oxide units was 0.05. This mixed solution was casted on a mold made of polytetrafluoroethylene, dried; heated and pressurized at 160° C. and 20 KgW/cm$^2$ for 10 minutes to obtain a film. This film was immersed in a propylene carbonate liquid for 24 hours and impregnated with 0.5 ml of the liquid, and then allowed to stand at 100° C. for 24 hours to obtain a gel-like electrolyte film.

Example 3

The polyether copolymer (1 g) shown in Table 1 polymerized by using the organotin-phosphate ester condensate catalyst and dicumyl peroxide (a crosslinking agent) (0.015 g) were mixed with a propylene carbonate solution (0.7 ml) of lithium perchlorate so that a molar ratio of the number of moles of the soluble electrolyte salt compound to the total number of moles of ethylene oxide units was 0.05. This mixed solution was casted on a mold made of polytetarfluoroethylene, heated and pressurized at 160° C. and 20 KgW/cm$^2$ for 10 minutes to obtain a gel-like film.

Example 4

The polyether copolymer (1 g) shown in Table 1 polymerized by using the organotin-phosphate ester condensate catalyst and dicumyl peroxide (a crosslinking agent) (0.015 g) were dissolved in tetrahydrofuran (20 ml), and the resulting solution was casted on a mold made of polytetarfluoroethylene, heated and pressurized at 160° C. and 20 KgW/cm$^2$ for 10 minutes to remove tetrahydrofuran and to obtain a film. This film was immersed in a γ-butyrolactone solution of lithium perchlorate and impregnated with 2 ml of the electrolyte salt solution so that a molar ratio of the number of moles of the soluble electrolyte salt compound to the total number of moles of ethylene oxide units was 0.05, thereby obtaining a gel-like film.

Examples 5 and 6

To each polyether copolymer (1 g) shown in Table 1 polymerized by using the organotin-phosphate ester condensate catalyst, a propylene carbonate solution (0.6 ml) of lithium bistrifluoromethane sulfonylimide was added so that a molar ratio of the number of moles of the soluble electrolyte salt compound to the total number of moles of ethylene oxide units was 0.05. To the resulting solution, water was added in an equimolar amount based on the reactive silicon group-containing component. This mixed gel was casted on a mold made of polytetarfluoroethylene, heated and pressurized at 160° C. and 20 KgW/cm$^2$ for 10 minutes to obtain a gel-like film.

Examples 7 and 8

Each polyether copolymer (1 g) shown in Table 1 polymerized by using the organotin-phosphate ester condensate catalyst and diethyltriamine (a crosslinking agent) (50 mg) were mixed with a γ-butyrolactone solution (0.5 ml) of lithium perchlorate in Example 7 or a tetraethylene glycol dimethylether solution (0.5 ml) of lithium perchlorate in Example 8 so that a molar ratio of the number of moles of the soluble electrolyte salt compound to the total number of moles of ethylene oxide units was 0.05. This mixed gel was casted on a mold made of polytetarfluoroethylene, heated and pressurized at 160° C. and 20 KgW/cm$^2$ for 10 minutes to obtain a gel-like film.

Comparative Example 1

The polyethylene oxide (1 g) shown in Table 2 polymerized by using the organotin-phosphate ester condensate catalyst was mixed with a tetrahydrofuran solution of lithium perchlorate so that a molar ratio of the number of moles of the soluble electrolyte salt compound to the total number of moles of ethylene oxide units was 0.005. This solution was casted on a mold made of polytetrafluoroethylene, dried to sufficiently remove tetrahydrofuran and pressure-molded to obtain a film.

Comparative Example 2

The same operation as in Comparative Example 1 was conducted, except for using the polyether copolymer shown in Table 2 polymerized by using the organotin-phosphate ester condensate catalyst, but no film was obtained.

Comparative Example 3

The polyether copolymer (1 g) shown in Table 2 polymerized by using the organotin-phosphate ester condensate catalyst and dicumyl peroxide (a crosslinking agent) (0.015 g) were dissolved in tetrahydrofuran (20 ml), and the resulting solution was mixed with a tetrahydrofuran solution of lithium perchlorate so that a molar ratio of the number of moles of the soluble electrolyte salt compound to the total number of moles of ethylene oxide units was 0.05. This mixed solution was casted on a mold made of polytetrafluoroethylene, dried to sufficiently remove tetrahydrofuran, heated and pressurized at 160° C. and 20 KgW/cm² for 10 minutes to obtain a film.

Comparative Example 4

The polyether copolymer (the same copolymer as that of Example 3)(1 g) shown in Table 2 polymerized by using the organotin-phosphate ester condensate catalyst and dicumyl peroxide (a crosslinking agent) (0.015 g) were mixed with a tetrahydrofuran solution (5 ml) of lithium perchlorate so that a molar ratio of the number of moles of the soluble electrolyte salt compound to the total number of moles of ethylene oxide units was 0.05. This mixed solution was casted on a mold made of polytetrafluoroethylene and dried and heated at 160° C. and 20 Kg/cm² for 10 minutes to obtain a film.

Comparative Example 5

In same manner as that described in example 3 except for using the polyether polymer in Table 2 polymerized by using the organotin-phosphate ester condensate catalyst, a gel-like film was obtained.

Example 9

Using the gel-like polymer solid electrolyte obtained in Example 3 as an electrolyte, a lithium metal foil as a negative electrode and lithium cobaltate ($LiCoO_2$) as a positive electrode, a secondary battery was constructed. The size of the gel-like polymer solid electrolyte was 10 mm×10 mm×1 mm. The size of the lithium foil was 10 mm×10 mm×0.1 mm. Lithium cobaltate was prepared by mixing predetermined amount of lithium carbonate and cobalt carbonate powder and calcining the mixture at 900° C. for 5 hours. The calcined mixture was ground, and then 12 parts by weight of acetylene black and 3 parts by weight of the crosslinked polymer solid electrolyte obtained in Example 3 were added to 85 parts by weight of the resulting lithium cobaltate, followed by mixing using a roll and further press-molding under the pressure of 300 KgW/cm² to form the positive electrode having the size of 10 mm×10 mm×2 mm.

The gel-like polymer solid electrolyte obtained in Example 3 was sandwiched between the lithium metal foil and the lithium cobaltate plate, and the charge/discharge characteristics of the resulting battery were examined with applying the pressure of 10 KgW/cm² so that the interfaces are brought into contact with each other. The discharge current at the initial terminal voltage of 3.2 V was 0.5 mA/cm² and the charging could be conducted at 0.4 mA/cm². It is possible to reduce the thickness of the battery in this Example and, therefore, a light-weight and large-capacity battery can be obtained.

TABLE 1

| | Example No. | | | | | |
|---|---|---|---|---|---|---|
| | 1 | 2 | 3 | 4 | 5 | 6 |
| Composition of formed copolymer (% by mol) | | | | | | |
| Monomer of the formula (1) | 95 | 10 | 9 | 8 | 9.9 | 14.7 |
| Ethylene oxide | 5 | 90 | 90 | 87 | 90 | 85 |
| Allyl glycidyl ether | | | 1 | | | |
| Glycidyl methacrylate | | | | 5 | | |
| γ-Glycidoxypropylmethyldimethoxysilane | | | | | | 0.3 |
| γ-Glycidoxypropyltrimethoxysilane | | | | | 0.1 | |
| Oxyethylene unit of the side chain portion of the formula (1) | | | | | | |
| Polymerization degree: n | 2 | 2 | 2 | 4 | 8.5 | 2 |
| Substituent: $R^1$ | —$CH_3$ | —$CH_2$—CH=$CH_2$ | —$CH_3$ | —$CH_3$ | —$CH_3$ | cyclohexyl |
| Number-average molecular weight of copolymer | 1,100,000 | 300,000 | 350,000 | 660,000 | 170,000 | 390,000 |
| Glass transition temperature of copolymer (° C.) | −61 | −67 | −67 | −68 | −63 | −61 |
| Fusion heat of copolymer (J/g) | 0 | 39 | 47 | 38 | 10 | 7 |
| Amount (g) of organic solvent per 1 g of polymer | 1.5 | 0.5 | 0.7 | 2 | 0.6 | 0.6 |
| Conductivity of solid electrolyte film (S/cm) 20° C. | $1.1 \times 10^{-2}$ | $9.8 \times 10^{-3}$ | $7.7 \times 10^{-3}$ | $1.0 \times 10^{-2}$ | $2.1 \times 10^{-3}$ | $4.5 \times 10^{-3}$ |

| | Example No. | |
|---|---|---|
| | 7 | 8 |
| Composition of formed copolymer (% by mol) | | |
| Monomer of the formula (1) | 45 | 15 |
| Ethylene oxide | 52 | 78 |
| 2,3-Epoxypropyl-2',3'-epoxy-2'-methyl propyl ether | 3 | |
| Diethylene glycol 2,3-epoxypropyl-2',3'-epoxy-2'-methyl propyl ether | | 7 |

TABLE 1-continued

| Oxyethylene unit of the side chain portion of the formula (1) | | |
|---|---|---|
| Polymerization degree: n | 3 | 2 |
| Substituent: $R^1$ | $-CH_3$ | $-(CH_2)_3-CH_3$ |
| Number-average molecular weight of copolymer | 320,000 | 280,000 |
| Glass transition temperature of copolymer (° C.) | −70 | −68 |
| Fusion heat of copolymer (J/g) | 3 | 13 |
| Amount (g) of organic solvent per 1 g of polymer | 0.5 | 0.5 |
| Conductivity of solid electrolyte film (S/cm) 20° C. | $3.0 \times 10^{-2}$ | $7.6 \times 10^{-3}$ |

Note:
Monomer of the formula (1):

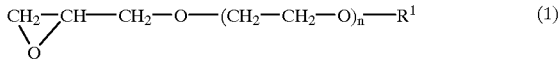

TABLE 2

| | Comparative Example No. | | | | |
|---|---|---|---|---|---|
| | 1 | 2 | 3 | 4 | 5 |
| Composition of formed copolymer (% by mol) | | | | | |
| Monomer of the formula (1) | | 100 | | 9 | |
| Ethylene oxide | 100 | | 98 | 90 | 58 |
| Allyl glycidyl ether | | | 2 | 1 | 3 |
| Epichlorohydrin | | | | | 39 |
| Oxyethylene unit of the side chain portion of the formula (1) | | | | | |
| Polymerization degree: n | | 2 | | 2 | |
| Substituent: $R^1$ | | $-CH_3$ | | $-CH_3$ | |
| Number-average molecular weight of copolymer | 200,000 | 100,000 | 950,000 | 350,000 | 220,000 |
| Glass transition temperature of copolymer (° C.) | −59 | −74 | −62 | −67 | −49 |
| Fusion heat of copolymer (J/g) | 164 | 0 | 153 | 47 | 0 |
| Amount (g) of organic solvent per 1 g of polymer | 0 | 0 | 0 | 0 | 0.7 |
| Conductivity of solid electrolyte film (S/cm) 20° C. | $1.1 \times 10^{-6}$ | impossible to form film | $1.8 \times 10^{-6}$ | $1.5 \times 10^{-4}$ | $8.5 \times 10^{-5}$ |

Note:
Monomer of the formula (1):

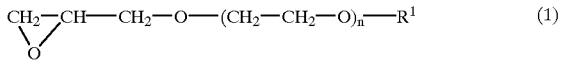

Example 10

After the atmosphere in a four-necked glass flask (internal volume: 3L) was replaced by nitrogen, an organotin-phosphate ester condensate (1 g) as the catalyst, diethylene glycol glycidyl methyl ether (42 g) whose water content was adjusted to not more than 10 ppm and n-hexane (1000 g) as the solvent were charged in the flask, and ethylene oxide (200 g) was gradually added with monitoring the polymerization degree of diethylene glycol glycidyl methyl ether by gas chromatography. The polymerization reaction was terminated by using methanol. The polymer was isolated by decantation, dried at 40° C. under a normal pressure for 24 hours, and then dried at 45° C. under reduced pressure for 10 hours to obtain 200 g of a polymer. The glass transition temperature of this copolymer was −61° C., the number-average molecular weight obtained by gel permeation chromatography was 1,100,000 and the fusion heat was 0 J/g. The results of the composition analysis (in terms of monomer) of this polymer by $^1$H NMR spectrum are as shown in Example 10 of Table 3. The resulting polyether copolymer (1 g) and polyethylene glycol diethyl ether (number-average molecular weight as polyalkylene glycol (the same in the following Examples and Comparative Examples) Mn: 500) (0.4 g) were dissolved in a tetrahydrofuran (20 ml), and the resulting solution was mixed with a tetrahydrofuran solution of lithium perchlorate so that a molar ratio of the number of moles of the soluble electrolyte salt compound to the total number of moles of ethylene oxide units was 0.05. This mixed liquid was casted on a mold made of polytetrafluoroethylene, dried (tetrahydrofuran was removed in this process), heated and pressurized at 100° C. and 20 KgW/cm² for 10 minutes to obtain an electrolyte film.

Example 11

The polyether copolymer (1 g) shown in Table 3 polymerized by using the organotin-phosphate ester condensate catalyst, polyethylene glycol dimethacrylate ester (Mn: 1,000)(0.3 g) and dicumyl peroxide (a crosslinking agent) (0.015 g) were dissolved in tetrahydrofuran (20 ml), and the resulting solution was mixed with a tetrahydrofuran solution (5 ml) of lithium perchlorate so that a molar ratio of the number of moles of the soluble electrolyte salt compound to the total number of ethylene oxide units was 0.05. This mixed solution was casted on a mold made of polytetrafluoroethylene, dried, heated and pressurized at 160° C. and 20 KgW/cm² for 10 minutes to give a film.

Example 12

The polyether copolymer (1 g) shown in Table 3 polymerized by using the organotin-phosphate ester condensate catalyst, polyethylene glycol dimethyl ether (Mn: 1,000)(0.3 g) and dicumyl peroxide (a crosslinking agent) (0.015 g) were dissolved with a tetrahydrofuran (20 ml), and the resulting solution was mixed with a tetrahydrofuran solution (5 ml) of lithium perchlorate so that a molar ratio of the number of moles of the soluble electrolyte salt compound to the total number of moles of ethylene oxide units was 0.05. This mixed solution was casted on a mold made of polytetrafluoroethylene, dried, heated and pressurized at 160° C. and 20 KgW/cm$^2$ for 10 minutes to give a film.

Example 13

The polyether copolymer (1 g) shown in Table 3 polymerized by using the organotin-phosphate ester condensate catalyst, a lithium salt of polyethylene glycol (prepared by adding a 2-fold molar amount of metal lithium to polyethylene glycol having a number-average molecular weight of 400, followed by standing at room temperature for 3 days) (0.2 g) and dicumyl peroxide (a crosslinking agent) (0.015 g) were dissolved in tetrahydrofuran (20 ml), and the resulting solution was mixed with a tetrahydrofuran solution (5 ml) of lithium perchlorate so that a molar ratio of the number of moles of the soluble electrolyte salt compound to the total number of ethylene oxide units was 0.05. This mixed solution was casted on a mold made of polytetrafluoroethylene, heated and pressurized at 160° C. and 20 KgW/cm$^2$ for 10 minutes to give a film.

Examples 14 and 15

Each polyether copolymer (1 g) shown in Table 3 polymerized by using the organotin-phosphate ester condensate catalyst and a sodium salt of polyethylene glycol monomethyl ether (prepared by adding an equimolar amount of metal sodium to polyethylene glycol monomethyl ether having a number-average molecular weight of 500, followed by standing at room temperature for 3 days)(0.2 g) were added to a tetrahydrofuran solution (20 ml) of lithium bistrifluoromethanesulfonylimide so that a molar ratio of the number of moles of the soluble electrolyte salt compound to the total number of ethylene oxide units was 0.05. To the resulting solution, water was added in an equimolar amount based on the reactive silicon group-containing component, followed by mixing. This mixed solution was casted on a mold made of polytetrafluoroethylene, heated and pressurized at 160° C. and 20 KgW/cm$^2$ for 10 minutes to obtain a film.

Examples 16 and 17

Each polyether copolymer (1 g) shown in Table 3 polymerized by using the organotin-phosphate ester condensate catalyst, diethylenetriamine (50 mg) (a crosslinking agent) and a tetarhydrofuran solution (10 ml) of lithium perchlorate were mixed so that a molar ratio of the number of moles of the soluble electrolyte salt compound to the total number of moles of ethylene oxide units was 0.05. In Example 16, the resulting solution was mixed with polyethylene glycol dimethyl ether (Mn: 600) (0.2 g). In Example 17, the resulting solution was mixed with a dioctyl aluminum salt of polyethylene glycol (prepared by adding a two-fold molar amount of trioctyl aluminum to polyethylene glycol having a number-average molecular weight of 400, followed by drying under reduced pressure) (0.2 g). These mixed solutions were casted on a mold made of polytetrafluoroethylene, heated and pressurized at 160° C. and 20 KgW/cm$^2$ for 10 minutes to obtain a film, respectively.

Comparative Example 6

The polyethylene oxide (1 g) shown in Table 4 polymerized by using the organotin-phosphate ester condensate catalyst was mixed with a tetrahydrofuran solution of lithium perchlorate so that a molar ratio of the number of moles of the soluble electrolyte salt compound to the total number of moles of ethylene oxide units was 0.005. Furthermore, polyethylene glycol dimethyl ether (Mn: 1,000)(0.2 g) was dissolved in tetrahydrofuran (20 ml) and this solution was added. This mixed solution was casted on a mold made of polytetrafluoroethylene and then pressure-molded to obtain a film.

Comparative Example 7

The same operation as that described in Comparative Example 6 was conducted, except for using the polyether polymer shown in Table 4 polymerized by using the organotin-phosphate ester condensate catalyst, but a film was not obtained.

Comparative Example 8

The polyether copolymer (1 g) shown in Table 4 polymerized by using the organotin-phosphate ester condensate catalyst and dicumyl peroxide (a crosslinking agent) (0.015 g) were dissolved in tetrahydrofuran (20 ml), and the resulting solution was mixed with a tetrahydrofuran solution of lithium perchlorate so that a molar ratio of the number of moles of the soluble electrolyte salt compound to the total number of moles of ethylene oxide units was 0.05. Furthermore, polyethylene glycol dimethyl ether (Mn: 1,000)(0.2 g) was dissolved in tetrahydrofuran (20 ml) and this solution was added. This mixed solution was casted on a mold made of polytetrafluoroethylene, dried to sufficiently remove tetrahydrofuran, heated and pressurized at 160° C. and 20 KgW/cm$^2$ for 10 minutes to give a film.

Comparative Example 9

The polyether copolymer (1 g) shown in Table 4 polymerized by using the organotin-phosphate ester condensate catalyst (the same copolymer as in Example 12) and dicumyl peroxide (a crosslinking agent) (0.015 g) were mixed with a tetrahydrofuran solution (5 ml) of lithium perchlorate so that a molar ratio of the number of moles of the soluble electrolyte salt compound to the total number of moles of ethylene oxide units was 0.05. This mixed solution was casted on a mold made of polytetrafluoroethylene, dried, heated at 160° C. and 20 KgW/cm$^2$ for 10 minutes to obtain a film.

Comparative Example 10

In the same manner as that described in Example 12 except for using the polyether copolymer shown in Table 4 polymerized by using the organotin-phosphate ester condensate catalyst, a film was obtained.

Examples 18 to 20

Each polyether copolymer (1 g) shown in Table 5 polymerized by using the organotin-phosphate ester condensate catalyst and an acetonitrile solution (15 mL) of lithium perchlorate were mixed so that a molar ratio of the number of moles of the soluble electrolyte salt compound to the total number of moles of ethylene oxide units was 0.1. In Example 18, the resulting solution was mixed with a branched ethylene glycol derivative represented by the formula (10) (0.3 g) to prepare a mixed solution. In Example 19, the resulting solution was mixed with a branched ethylene glycol derivative represented by the formula (11) (0.3 g) to prepare a mixed solution. In Example 20, the resulting solution was mixed with a branched ethylene glycol derivative represented by the formula (12) (0.3 g) to prepare a mixed solution. These mixed solutions were casted on a mold made of polytetrafluoroethylene and heated and pressurized at 160° C. and 20 Kg/cm² for 10 minutes to obtain a film, respectively. Characteristics of the films are shown in Table 5.

Lithium cobaltate was prepared by mixing predetermined amount of lithium carbonate and cobalt carbonate powder and calcining the mixture at 900° C. for 5 hours. The calcined mixture was ground, and then 12 parts by weight of acetylene black and 3 parts by weight of the crosslinked polymer solid electrolyte obtained in Example 12 were added to 85 parts by weight of the resulting lithium cobaltate, followed by mixing by a roll and further press-molding under the pressure of 300 KgW/cm² to form the positive electrode having the size of 10 mm×10 mm×2 mm.

The polymer solid electrolyte obtained in Example 12 was sandwiched between the lithium metal foil and the lithium cobaltate plate, and the charge/discharge characteristics of the resulting battery were examined with applying the

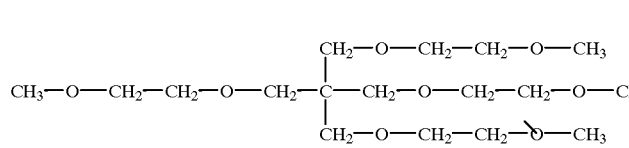
(10)

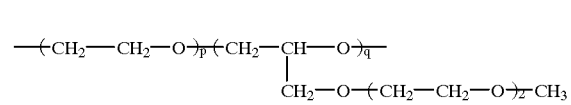
(11)

Mn 560, q/(p + q) = 0.1

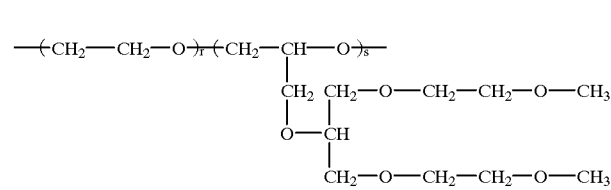
(12)

Mn 880, s/(r + s) = 0.1

Example 21

Using the polymer solid electrolyte obtained in Example 12 as an electrolyte, a lithium metal foil as a negative electrode and lithium cobaltate (LiCoO₂) as a positive electrode, a secondary battery was constructed. The size of the polymer solid electrolyte was 10 mm×10 mm×1 mm. The size of the lithium foil was 10 mm×10 mm×0.1 mm.

pressure of 10 KgW/cm² so that the interfaces are brought into contact with each other. The discharge current at the initial terminal voltage of 3.2 V was 0.5 mA/cm² and charging could be conducted at 0.4 mA/cm². It is possible to reduce the thickness of the battery in this Example and, therefore, a light-weight and large-capacity battery can be obtained.

TABLE 3

|  | Example No. | | | | | |
| --- | --- | --- | --- | --- | --- | --- |
|  | 10 | 11 | 12 | 13 | 14 | 15 |
| Composition of formed copolymer (% by mol) | | | | | | |
| Monomer of the formula (1) | 95 | 10 | 9 | 8 | 9.9 | 14.7 |
| Ethylene oxide | 5 | 90 | 90 | 87 | 90 | 85 |
| Allyl glycidyl ether |  |  | 1 |  |  |  |
| Glycidyl methacrylate |  |  |  | 5 |  |  |
| γ-Glycidoxypropylmethyldimethoxysilane |  |  |  |  |  | 0.3 |
| γ-Glycidoxypropyltrimethoxysilane |  |  |  |  | 0.1 |  |
| Oxyethylene unit ot the side chain portion of the formula (1) | | | | | | |
| Polymerization degree: n | 2 | 2 | 2 | 4 | 8.5 | 2 |

TABLE 3-continued

| Substituent: $R^1$ | —$CH_3$ | —$CH_2$—$CH$=$CH_2$ | —$CH_3$ | —$CH_3$ | —$CH_3$ | cyclohexyl |
|---|---|---|---|---|---|---|
| Number-average molecular weight of copolymer | 1,100,000 | 300,000 | 350,000 | 660,000 | 170,000 | 390,000 |
| Glass transition temperature of copolymer (° C.) | −61 | −67 | −67 | −68 | −63 | −61 |
| Fusion heat of copolymer (J/g) | 0 | 39 | 47 | 38 | 10 | 7 |
| Amount (g) of polyalkylene glycol compound per 1 g of copolymer | 0.4 | 0.3 | 0.3 | 0.2 | 0.2 | 0.2 |
| Conductivity of solid electrolyte film (S/cm) 20° C. | $6.5 \times 10^{-3}$ | $4.2 \times 10^{-3}$ | $4.7 \times 10^{-3}$ | $1.3 \times 10^{-3}$ | $1.1 \times 10^{-3}$ | $1.4 \times 10^{-3}$ |

| | Example No. | |
|---|---|---|
| | 16 | 17 |
| Composition of formed copolymer (% by mol) | | |
| Monomer of the formula (1) | 45 | 15 |
| Ethylene oxide | 52 | 78 |
| 2,3-Epoxypropyl-2',3'-epoxy-2'-methyl propyl ether | 3 | |
| Diethylene glycol 2,3-epoxypropyl-2',3'-epoxy-2'-methyl propyl ether | | 7 |
| Oxyethylene unit of the side chain portion of the formula (1) | | |
| Polymerization degree: n | 3 | 2 |
| Substituent: $R^1$ | —$CH_3$ | —$(CH_2)_3$—$CH_3$ |
| Number-average molecular weight of copolymer | 320,000 | 280,000 |
| Glass transition temperature of copolymer (° C.) | −70 | −68 |
| Fusion heat of copolymer (J/g) | 3 | 13 |
| Amount (g) of polyalkylene glycol compound per 1 g of copolymer | 0.2 | 0.2 |
| Conductivity of solid electrolyte film (S/cm) 20° C. | $4.7 \times 10^{-3}$ | $1.0 \times 10^{-3}$ |

Note:
Monomer of the formula (1):

$$CH_2\!\!-\!\!\underset{\underset{O}{\diagdown\!\diagup}}{CH}\!\!-\!\!CH_2\!\!-\!\!O\!\!-\!\!(CH_2\!\!-\!\!CH_2\!\!-\!\!O)_n\!\!-\!\!R^1 \qquad (1)$$

TABLE 4

| | Comparative Example No. | | | | |
|---|---|---|---|---|---|
| | 6 | 7 | 8 | 9 | 10 |
| Composition of formed copolymer (% by mol) | | | | | |
| Monomer of the formula (1) | | 100 | | 9 | |
| Ethylene oxide | 100 | | 98 | 90 | 58 |
| Allyl glycidyl ether | | | 2 | 1 | 3 |
| Epichlorohydrin | | | | | 39 |
| Oxyethylene unit of the side chain portion of the formula (1) | | | | | |
| Polymerization degree: n | | 2 | | 2 | |
| Substituent: $R^1$ | | —$CH_3$ | | —$CH_3$ | |
| Number-average molecular weight of copolymer | 200,000 | 100,000 | 950,000 | 350,000 | 220,000 |
| Glass transition temperature of copolymer (° C.) | −59 | −74 | −62 | −67 | −49 |
| Fusion heat of copolymer (J/g) | 164 | 0 | 153 | 47 | 0 |
| Amount (g) of polyalkylene glycol compound per 1 g of copolymer | 0.2 | 0.2 | 0.2 | 0 | 0.7 |
| Conductivity of solid electrolyte film (S/cm) 2° C. | $9.5 \times 10^{-5}$ | impossible to form film | $1.0 \times 10^{-4}$ | $1.5 \times 10^{-4}$ | $1.2 \times 10^{-6}$ |

Note:
Monomer of the formula (1):

$$CH_2\!\!-\!\!\underset{\underset{O}{\diagdown\!\diagup}}{CH}\!\!-\!\!CH_2\!\!-\!\!O\!\!-\!\!(CH_2\!\!-\!\!CH_2\!\!-\!\!O)_n\!\!-\!\!R^1 \qquad (1)$$

TABLE 5

|  | Example No. | | |
| --- | --- | --- | --- |
|  | 18 | 19 | 20 |
| Composition of formed copolymer (% by mol) | | | |
| Monomer of the formula (1) | 11 | 20 | 24 |
| Ethylene oxide | 89 | 80 | 76 |
| Oxyethylene unit of the side chain portion of the formula (1) | | | |
| Polymerization degree: n | 3 | 2 | 2 |
| Substituent: $R^1$ | $-CH_3$ | $-CH_3$ | $-CH_3$ |
| Number-average molecular weight of copolymer | 1,300,000 | 1,200,000 | 880,000 |
| Glass transition temperature of copolymer (° C.) | −68 | −69 | −73 |
| Fusion heat of copolymer (J/g) | 40 | 17 | 9 |
| Amount (g) of polyalkylene glycol compound per 1 g of copolymer | 0.3 | 0.3 | 0.3 |
| Conductivity of solid electrolyte film (S/cm) 20° C. | $7.6 \times 10^{-3}$ | $6.1 \times 10^{-3}$ | $5.2 \times 10^{-3}$ |

Note:
Monomer of the formula (1):

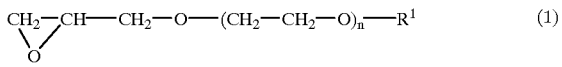  (1)

EFFECT OF THE INVENTION

The polymer solid electrolyte of the present invention is superior in processability, moldability, mechanical strength, flexibility, heat resistance, etc., and the ionic conductivity is remarkably improved. Accordingly, it can be applied to electronic apparatuses such as large-capacity condenser and display device (e.g. electrochromic display), including solid batteries (particularly, secondary battery).

What is claimed is:

1. A polymer solid electrolyte comprising:
   (1) an optionally crosslinked polyether copolymer having a number-average molecular weight of 10,000 to 2,000,000 and comprising:
      (A) 1 to 99% by mol of a repeating unit derived from a monomer represented by the formula (I):

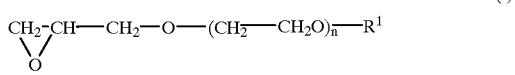  (I)

wherein $R^1$ is a group selected from an alkyl group having 1 to 12 carbon atoms, an alkenyl group having 2 to 8 carbon atoms, a cycloalkyl group having 3 to 8 carbon atoms, an aryl group having 6 to 14 carbon atoms, an aralkyl group having 7 to 12 carbon atoms and a tetrahydropyranyl group; and n is a numeral of 1 to 12;

(B) 99 to 1% by mol of a repeating unit, other than the repeating unit (A), derived from a monomer represented by the formula (II):

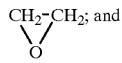  (II)

(C) greater than 0 and up to 15 by mol of a repeating unit, other than the repeating unit (A), derived from a monomer having one epoxy group and at least one reactive functional group, said reactive functional group being (a) a reactive silicon group, (b) an epoxy group, (c) an ethylenically unsaturated group or (d) a halogen atom; the polyether copolymer being a random copolymer; (2) an electrolyte salt compound; and (3) a plasticizer selected from the group consisting of an aprotic organic solvent, and a derivative or metal salt of a straight-chain or branched polyalkylene glycol having a number-average molecular weight of 200 to 5,000 or a metal salt of the derivative.

2. The polymer solid electrolyte according to claim 1, wherein the glass transition temperature and fusion heat of the polyether copolymer measured by a differential scanning calorimeter (DSC) are not more than −60° C. and not more than 90 J/g, respectively.

3. The polymer solid electrolyte according to claim 1, wherein the repeating unit (C) is derived from a monomer of the formula (III-1) or (III-2):

  (III-1)

  (III-2)

wherein $R^2$ and $R^3$ represent a group having a reactive functional group.

4. The polymer solid electrolyte according to claim 1, wherein the monomer, which constitutes the repeating unit (C), is represented by the formula (III-a-1-1), (III-a-1-2) or (III-a-2-1):

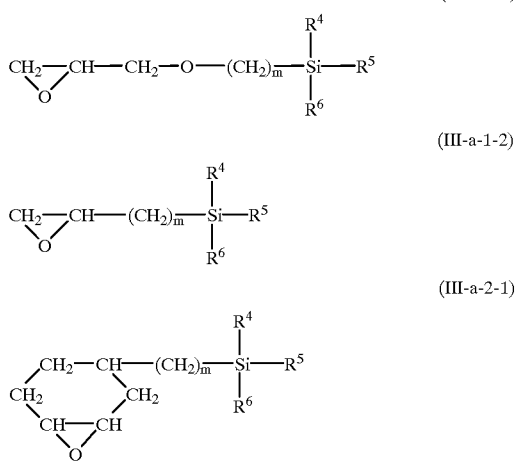

(III-a-1-1)

(III-a-1-2)

(III-a-2-1)

wherein $R^4$, $R^5$ and $R^6$ may be the same or different, and at least one of them represents an alkoxy group and the remainder represents an alkyl group; and m represents 1 to 6.

5. The polymer solid electrolyte according to claim 1, wherein the monomer, which constitutes the repeating unit (C), is 3-glycidoxypropyltrimethoxysilane, 3-glycidoxypropylmethyldimethoxysilane, 4-(1,2-epoxy) butyltrimethoxysilane, 5-(1,2-epoxy)pentyltrimethoxysilane or 2-(3,4-epoxycyclohexyl)ethyltrimethoxysilane.

6. The polymer solid electrolyte according to claim 1, wherein the monomer, which constitutes the repeating unit (C), is represented by the formula (III-b):

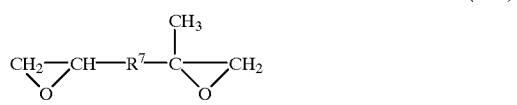

(III-b)

wherein $R^7$ is a divalent organic group.

7. The polymer solid electrolyte according to claim 6, wherein $R^7$ in the formula (III-b) is

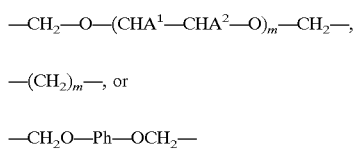

wherein $A^1$ and $A^2$ represent hydrogen or a methyl group; Ph represents a phenylene group; and m represents a numeral of 0 to 12.

8. The polymer solid electrolyte according to claim 1, wherein the monomer, which constitutes the repeating unit (C), is 2,3-epoxypropyl-2',3'-epoxy-2'-methyl propyl ether or ethylene glycol-2,3-epoxypropyl-2',3'-epoxy-2'-methyl propyl ether.

9. The polymer solid electrolyte according to claim 1, wherein the monomer, which constitutes the repeating unit (C), is represented by the formula (III-c):

(III-c)

wherein $R^8$ is a group having an ethylenically unsaturated group.

10. The polymer solid electrolyte according to claim 1, wherein the monomer having an ethylenically unsaturated group, which constitutes the repeating unit (C), is allyl glycidyl ether, 4-vinylcyclohexyl glycidyl ether, α-terpinyl glycidyl ether, cyclohexenylmethyl glycidyl ether, p-vinylbenzyl glycidyl ether, allylphenyl glycidyl ether, vinyl glycidyl ether, 3,4-epoxy-1-butene, 3,4-epoxy-1-pentene, 4,5-epoxy-2-pentene, 1,2-epoxy-5,9-cyclododecadiene, 3,4-epoxy-1-vinylcyclohexene, 1,2-epoxy-5-cyclooctene, glycidyl acrylate, glycidyl methacrylate, glycidyl sorbate, glycidyl cinnamate, glycidyl crotonate, glycidyl-4-hexenoate, oligoethylene glycol glycidyl ether acrylate having 1 to 12 oxyethylene chains, oligoethylene glycol glycidyl ether methacrylate having 1 to 12 oxyethylene chains, oligoethylene glycol allyl glycidyl ether having 1 to 12 oxyethylene chains, or

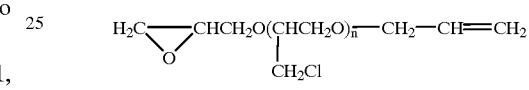

(n=1–12).

11. The polymer solid electrolyte according to claim 1, wherein the monomer, which constitutes the repeating unit (C), is represented by the formula (III-d):

(III-d)

wherein $R^9$ is a group having at least one halogen atom.

12. The polymer solid electrolyte according to claim 1, wherein the monomer which constitutes the repeating unit (C) is

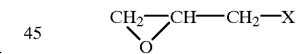

wherein X represents a bromine atom (Br) or an iodine atom (I).

13. The polymer solid electrolyte according to claim 1, wherein the polyether copolymer comprises 3 to 99% by mol of the repeating unit (A), 95 to 1% by mol of the repeating unit (B) and 0 to 5% by mol of the repeating unit (C).

14. The polymer solid electrolyte according to claim 1, wherein the electrolyte salt compound is a compound comprising a cation selected from a metal cation, an ammonium ion, an amidinium ion and a guanidium ion, and an anion selected from a chlorine ion, a bromine ion, a iodine ion, a perchlorate ion, a thiocyanate ion, a tetrafluoroborate ion, a nitrate ion, $AsF_6^-$, $PF_6^-$, a stearylsulfonate ion, an octylsulfonate ion, a dodecylbenzenesulfonate ion, a naphthalenesulfonate ion, a dodecyinaphthalenesulfonate ion, a 7,7,8,8-tetracyano-p-quinodimethane ion, $X^1SO_3^-$, $(X^1SO_2)(X^2SO_2)N^-$, $(X^1SO_2)(X^2SO_2)(X^3SO_2)C^-$ and $(X^1SO_2)(X^2SO_2)YC^-$ (wherein $X^1$, $X^2$, $X^3$ and Y respectively represent an electron attractive group).

15. The polymer solid electrolyte according to claim 14, wherein $X^1$, $X^2$ and $X^3$ independently represent a perfluoroalkyl having 1 to 6 carbon atoms or a perfluoroaryl group and Y represents a nitro group, a nitroso group, a carbonyl group, a carboxyl group or a cyano group.

16. The polymer solid electrolyte according to claim 14, wherein the metal cation is a cation of a metal selected from Li, Na, K, Rb, Cs, $Mg^-$, Ca and Ba metals.

17. The polymer solid electrolyte according to claim 14, wherein the metal cation is a cation of a transition metal.

18. The polymer solid electrolyte according to claim 14, wherein the metal cation is a cation of a metal selected from Mn, Fe, Co, Ni, Cu, Zn and Ag metals.

19. The polymer solid electrolyte according to claim 1, wherein the formulation ratio of the electrolyte salt compound to the polyether copolymer is so that a value of a molar ratio of the number of moles of the electrolyte salt compound to the total number of moles of oxyethylene units in the copolymer is from 0.0001 to 5.

20. The polymer solid electrolyte according to claim 1, wherein the aprotic organic solvent is an aprotic organic solvent selected from ethers or esters.

21. The polymer solid electrolyte according to claim 1, wherein the aprotic organic solvent is an organic solvent selected from propylene carbonate, γ-butyrolactone, butylene carbonate and 3-methyl-2-oxazolidone.

22. The polymer solid electrolyte according to claim 1, wherein the aprotic organic solvent is an organic solvent selected from triethylene glycol dimethyl ether, triethylene glycol diethyl ether, tetraethylene glycol dimethyl ether and tetraethylene glycol diethyl ether.

23. The polymer solid electrolyte according to claim 1, wherein the number-average molecular weight of the polyalkylene glycol is from 200 to 2000.

24. The polymer solid electrolyte according to claim 1, wherein the polyalkylene glycol is polyethylene glycol or polypropylene glycol.

25. The polymer solid electrolyte according to claim 1, wherein the derivative of the polyalkylene glycol is an ether derivative or an ester derivative.

26. The polymer solid electrolyte according to claim 25, wherein the ether derivative of the polyalkylene glycol is any one of polyethylene glycol dimethyl ether, polyethylene glycol diethyl ether and polyethylene glycol diallyl ether.

27. The polymer solid electrolyte according to claim 25, wherein the ester derivative of the polyalkylene glycol is any one of polyethylene glycol dimethacrylate ester, polyethylene glycol diacrylate ester and polyethylene glycol acetate ester.

28. The polymer solid electrolyte according to claim 1, wherein the metal salt of the polyalkylene glycol is any one of a sodium salt, a lithium salt and a dialkylaluminum salt.

29. The polymer solid electrolyte according to claim 1, wherein the metal salt of the polyalkylene glycol is any one of a lithium salt of polyethylene glycol and a dialkylaluminum salt of polyethylene glycol.

30. The polymer solid electrolyte according to claim 1, wherein the metal salt of the polyalkylene glycol is any one of a lithium salt of polyethylene glycol monomethyl ether, a lithium salt of polyethylene glycol monoethyl ether and a lithium salt of polyethylene glycol monoallyl ether.

31. The polymer solid electrolyte according to claim 1, wherein the metal salt of the polyalkylene glycol derivative is any one of a dioctylaluminum salt of polyethylene glycol monomethyl ether, a dioctylaluminum salt of polyethylene glycol monoethyl ether and a dioctylaluminum salt of polyethylene glycol monoallyl ether.

32. The polymer solid electrolyte according to claim 1, wherein the amount of the plasticizer is from 1 to 2,000 parts by weight based on 100 parts by weight of the polyether copolymer.

33. A battery comprising the polymer solid electrolyte of claim 1, a positive electrode and a negative electrode.

* * * * *